US012609972B2

(12) United States Patent
Winawer et al.

(10) Patent No.: US 12,609,972 B2
(45) Date of Patent: *Apr. 21, 2026

(54) COMMUNICATIONS SYSTEM WITH SEQUENCED CHAT, INTERACTIVE AND DIGITAL ENGAGEMENT FUNCTIONS INCLUDING PRE-CONNECTION WORKFLOW

(71) Applicant: Chatalyze, Inc., Menlo Park, CA (US)

(72) Inventors: Lloyd Winawer, Menlo Park, CA (US); Jordan Isaiah Winawer, Menlo Park, CA (US); Gunjot Singh Chawla, Pinjore (IN)

(73) Assignee: Chatalzye, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/772,192

(22) Filed: Jul. 14, 2024

(65) Prior Publication Data

US 2024/0406225 A1 Dec. 5, 2024

Related U.S. Application Data

(63) Continuation of application No. 18/051,489, filed on Oct. 31, 2022, now Pat. No. 12,069,106, which is a
(Continued)

(51) Int. Cl.
| | |
|---|---|
| *H04L 65/401* | (2022.01) |
| *G06Q 10/02* | (2012.01) |
| *H04L 51/046* | (2022.01) |
| *H04L 51/52* | (2022.01) |
| *H04L 65/1069* | (2022.01) |
| *H04L 65/1073* | (2022.01) |
| *H04L 65/1083* | (2022.01) |
(Continued)

(52) U.S. Cl.
CPC ......... *H04L 65/1069* (2013.01); *G06Q 10/02* (2013.01); *H04L 51/046* (2013.01); *H04L 51/52* (2022.05); *H04L 65/1073* (2013.01); *H04L 65/1083* (2013.01); *H04L 65/401* (2022.05); *H04L 65/403* (2013.01); *H04L 67/104* (2013.01); *H04L 67/1095* (2013.01); *H04L 69/28* (2013.01); *G06Q 50/01* (2013.01)

(58) Field of Classification Search
CPC ................................ H04L 51/52; G06Q 10/02
USPC ......................................................... 709/206
See application file for complete search history.

(56) References Cited

U.S. PATENT DOCUMENTS

| | | | |
|---|---|---|---|
| 7,716,376 | B1 | 5/2010 | Price |
| 7,958,453 | B1 | 6/2011 | Taing |
(Continued)

OTHER PUBLICATIONS

International Search Report for PCT/US2018/038699 dated Sep. 17, 2018 (16 pages).

*Primary Examiner* — Sibte H Bukhari
(74) *Attorney, Agent, or Firm* — Almanac IP Advisors LLP

(57) ABSTRACT

A networked communications system that facilitates real-time interaction with persons-of-interest. The real-time communications system includes a pre-connection workflow that allows for efficient utilization of human resources and/or more precise control of the interaction and engagement time intervals allotted to users of the system. The real-time communications system transmits event status information to users while waiting for respective communications sessions to begin.

15 Claims, 7 Drawing Sheets

Related U.S. Application Data continuation of application No. 17/227,713, filed on Apr. 12, 2021, now Pat. No. 11,489,882, which is a continuation of application No. 16/014,196, filed on Jun. 21, 2018, now Pat. No. 11,005,897.

(60) Provisional application No. 62/531,100, filed on Jul. 11, 2017.

(51) Int. Cl.

| | | |
|---|---|---|
| *H04L 65/403* | (2022.01) |
| *H04L 67/104* | (2022.01) |
| *H04L 67/1095* | (2022.01) |
| *H04L 69/28* | (2022.01) |
| *G06Q 50/00* | (2012.01) |

(56) References Cited

U.S. PATENT DOCUMENTS

| 8,891,939 | B2 | 11/2014 | Alexandrov |
| 9,002,945 | B2* | 4/2015 | Harris ..................... G07F 17/32 709/200 |
| 9,454,623 | B1 | 9/2016 | Kaptsan |
| 9,515,833 | B2 | 12/2016 | Bartkiewicz et al. |
| 9,515,838 | B2 | 12/2016 | McCoy |
| 9,519,886 | B2 | 12/2016 | Berger |
| 9,667,676 | B1 | 5/2017 | Lo |
| 9,804,754 | B2 | 10/2017 | Crawford |
| 2004/0010464 | A1 | 1/2004 | Boaz |
| 2006/0221195 | A1 | 10/2006 | Sohmers |
| 2007/0061460 | A1* | 3/2007 | Khan .................. H04L 63/0428 709/225 |
| 2009/0162028 | A1 | 6/2009 | Tanaka |
| 2010/0180207 | A1 | 7/2010 | MacGuire |
| 2011/0289422 | A1* | 11/2011 | Spivack ............... G06F 16/951 715/739 |
| 2012/0020649 | A1 | 1/2012 | Vanderkaden |
| 2013/0117665 | A1 | 5/2013 | Tagliaferri |
| 2014/0156833 | A1 | 6/2014 | Robinson |
| 2015/0007054 | A1 | 1/2015 | Qu |
| 2015/0052437 | A1 | 2/2015 | Crawford |
| 2016/0352912 | A1 | 12/2016 | Dhawan et al. |
| 2017/0142170 | A1 | 5/2017 | Sylvain |
| 2017/0235449 | A1 | 8/2017 | Walters |
| 2018/0046360 | A1 | 2/2018 | Crawford |

* cited by examiner

508

Time Remaining: 00:47

Hi Ilaana,
Great chatting with you!

27

Take screenshot          Get autograph 512                510                514

602 — Select Digital Object for Inscription

604 — Load Digital Object into Canvas

606 — Upload Digital Object

608 — Receive Real-Time Inscription Data over Connection; render to Canvas

610 — End of Inscription Session?          No

Yes

612 — Remove Canvas Object

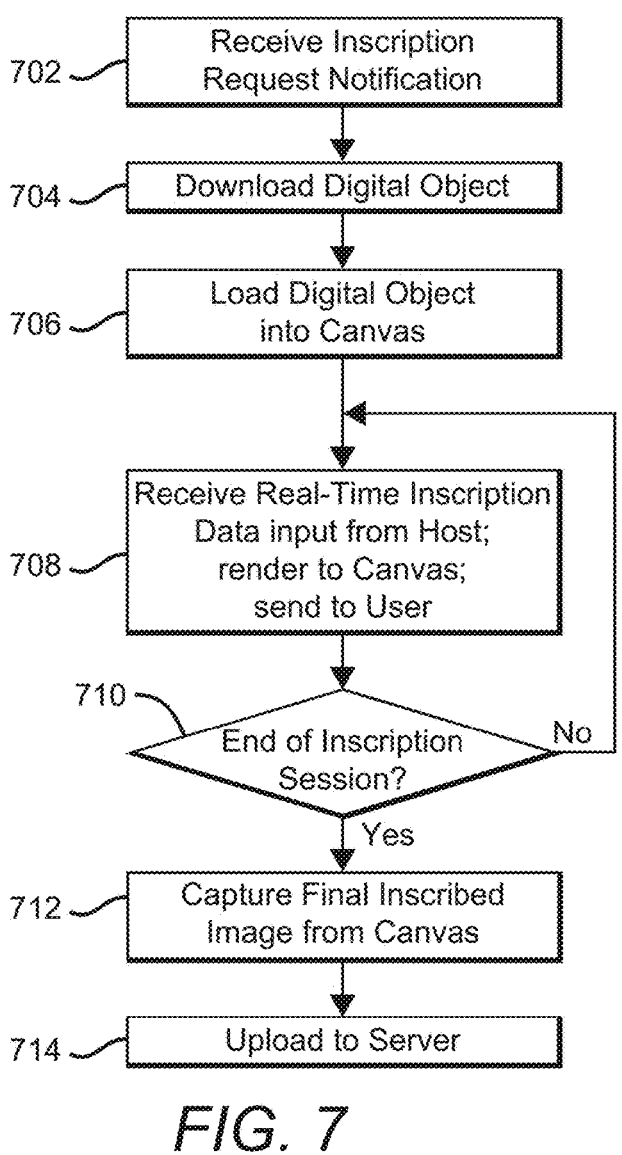

702 — Receive Inscription Request Notification

704 — Download Digital Object

706 — Load Digital Object into Canvas

708 — Receive Real-Time Inscription Data input from Host; render to Canvas; send to User 710 — End of Inscription Session?    No Yes 712 — Capture Final Inscribed Image from Canvas 714 — Upload to Server

*FIG. 7*

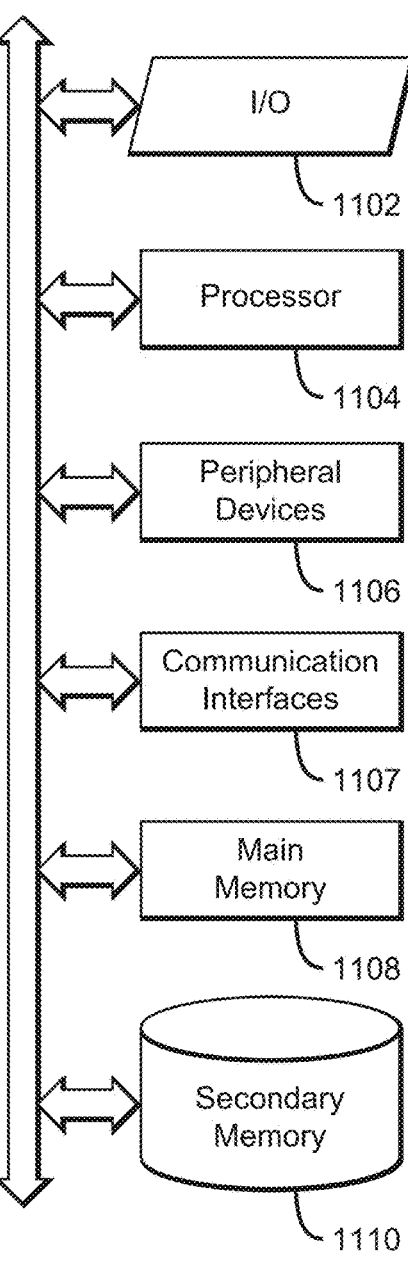

I/O — 1102

Processor — 1104

Peripheral Devices — 1106

Communication Interfaces — 1107

Main Memory — 1108

Secondary Memory — 1110

*FIG. 9*

COMMUNICATIONS SYSTEM WITH SEQUENCED CHAT, INTERACTIVE AND DIGITAL ENGAGEMENT FUNCTIONS INCLUDING PRE-CONNECTION WORKFLOW

CROSS REFERENCE TO RELATED APPLICATION

The present application is a continuation application of U.S. application Ser. No. 18/051,489 filed Oct. 31, 2022, which is a continuation application of U.S. application Ser. No. 17/227,713 filed Apr. 12, 2021, which is a continuation application of U.S. application Ser. No. 16/014,196 filed Jun. 21, 2018, which claims priority to U.S. provisional application Ser. No. 62/531,100, filed on Jul. 11, 2017, all of which are incorporated herein by reference for all purposes.

BACKGROUND

Field of the Disclosure

The disclosure relates generally to real-time communications, interactive digital engagement and digital memorabilia systems.

Description of Related Art

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Social media and internet-based communications systems are known. Many celebrities employ social media systems (such as twitter, Facebook, Instagram, and the like) to broadcast and disseminate information to their followers. Social media influencers—i.e., those with large groups of followers—and many other persons-of-interest and celebrities (whether in sports, literature, television, radio, music, theater or other forms of entertainment or information delivery)—have no readily available, practical and/or secure methods to engage directly and personally with individual followers.

Electronic or digital memorabilia systems have been proposed to extend the monetization opportunities for interactions and engagement of the type generally described. These systems may provide a mechanism for a subject to generate a signature that is applied to a digital content object, such as a digital image or to sell inscribed merchandise or provide other personally tailored deliverables or examples of monetization methods to a customer, patron, fan or other user.

SUMMARY OF THE DISCLOSURE

Embodiments of the present disclosure are directed to a networked communications system that facilitates real-time direct interaction and engagement with social influencers and other persons-of-interest and, in some implementations, the generation of digitally-inscribed, digital memorabilia, collectible items, other merchandise or other forms of personalized deliverables during such interactions. In some embodiments, the real-time communications system features an event scheduling workflow that, during a registration phase, allows users to register for a given event associated with a social influencer or other person-of-interest and, during the event, allows for a series of sequenced real-time direct and private interactions and engagements between or among the social influencer or other person-of-interest and respective users. In some embodiments, this series of sequenced real-time, direct, and private interactions and engagements occurs automatically without requiring the participants to exchange contact or personally identifiable information (such as email addresses, phone numbers, chat identifiers, etc.) in order to initiate the real-time communications sessions. In some embodiments, the real-time communications system features a pre-connection workflow that allows for efficient utilization of human resources and/or more precise control of the interaction and engagement time intervals allotted to users of the system. In other implementations, the system provides for real-time inscription (e.g., autograph) generation workflows during an interactive session, such as a video chat between a user and a person-of-interest.

BRIEF DESCRIPTION OF THE DRAWINGS

FIG. 7 is a flow chart diagram illustrating a method for implementing embodiments of the disclosure.

FIG. 9 illustrates an example of a computer system that may be used to execute program code to implement embodiments of the disclosure.

DETAILED DESCRIPTION

Figure 1:
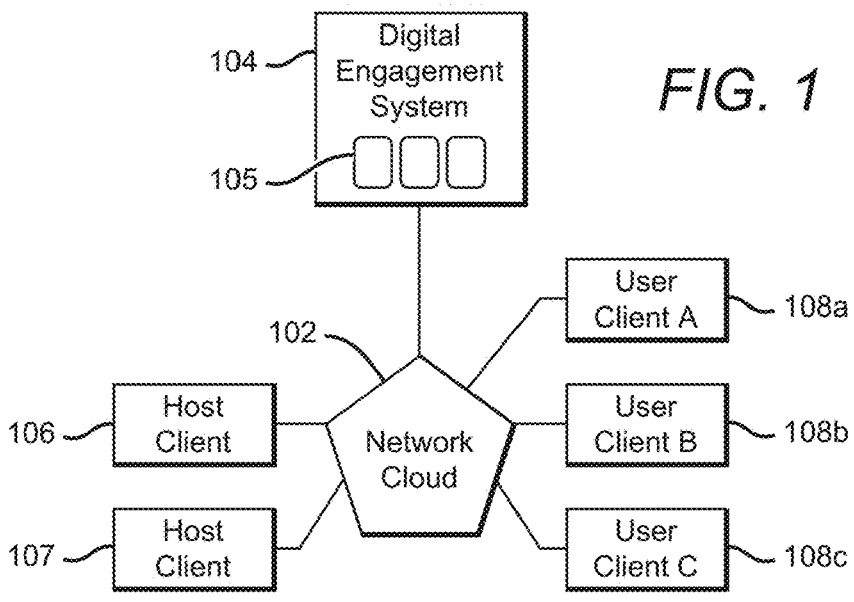
FIG. 1 illustrates a network computer system environment for implementing embodiments of the disclosure.

The present description is made with reference to the accompanying drawings, in which various example embodiments are shown. However, many different example embodiments may be used, and thus the description should not be construed as limited to the example embodiments set forth herein. Rather, these example embodiments are provided so that this disclosure will be thorough and complete. Various modifications to the exemplary embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein.

Mass, standardized engagement across a large following or user base is enabled by any of the social media or communications systems that proliferate today. Social media influencers have no practical or secure way of personally and directly engaging and interacting in real-time with individual followers without a requirement that personally identifiable information of the influencer or person-of-interest be shared with the follower or that personally identifiable information of the follower be shared with the influencer or person-of-interest. A real-time communications system that enables personal and direct interaction and engagement without a loss of privacy is required to permit influencers and others to obtain more value and benefits from social media platforms and the same real-time communications systems are required to permit followers to interact, personally and directly, with those influencers and persons-of-interest in a practical or secure manner.

Professional athletes, retired or current, represent one embodiment of these social influencers and persons-of-interest Within the sports universe, sports memorabilia and collectibles represent a multi-billion-dollar addressable market. One segment of that addressable market involves in-person events that are organized to provide opportunities for sports fans to interact with athletes and obtain signatures from those athletes. Sports figures from major league baseball are known to participate in many events of this nature. Athletes from other professional leagues and associations also participate in these events. Events like these, however, require that the athlete and fans travel to the same physical location. Getting to that location may require significant travel time. At these events, fans often have to wait in long lines and generally only have a few seconds to interact with the athlete and receive an autograph once they get to the front of the line. There is generally very little opportunity for personal engagement between the athlete and the fans at these events.

Authors may also desire to interact in a direct and personal manner with readers of their books. Authors may desire to conduct book signings through a real-time communications system by which they can speak directly to their readers, answer questions about their books and deliver signed electronic books to their fans. Musicians may have similar interests in direct and personal engagement. Many other types of influencers, including celebrities, may desire similar direct and personal engagement. Enterprises may desire to conduct direct and personal engagement with employees. Human resource interviews may be scheduled and sequenced through an interactive and direct channel of communication. Executives may desire to discuss corporate matters with employees through a real-time communications system that enables secure, personal and direct communication in a sequenced method.

In embodiments of the disclosure, "host" refers to an entity that hosts an event, such as a social influencer or other persons of-interest and celebrities, whether in sports, literature, television, radio, music, theater or other forms of entertainment or information delivery, to one or more customers, patrons, fans, followers or other users. A host can be a social influencer, celebrity (including a current or former professional athlete), an actor or other person for whom there exists a market of customers, patrons, fans or other users desiring and, in some instances, willing to pay for personal, direct interactive communications engagement sessions with such person. As used herein, "user" refers to an individual user of the system that registers for an event. Individuals may assume certain roles in the system depending on the context.

FIG. 1 illustrates a distributed system in which embodiments of the disclosure may operate. In embodiments, the distributed system may include digital engagement system 104, one or more host clients 106, one or more host clients 107, and one or more user clients 108a-c. The foregoing components of the system communicate over network cloud 102. Network cloud 102 comprises one or more telecommunications networks over which the various components of the system communicate. Network cloud 102 can include, without limitation, one or more of any of the following network types: local area networks, wide area networks, wireless cellular networks, cable networks, the internet, and the like. Digital engagement system 104 comprises one or more servers 105 that communicates with host client 106 and user clients 108a-c over network 102. The server(s) 105 are coupled locally or remotely to one or more databases, which may include one or more corpora of libraries including data such as image data, digital memorabilia data, host account data, user account data, and the like. In embodiments, the server(s) 105, host client 106, host client 107 and user clients 108a-c each include at least one processor and at least one memory storing instructions that, when executed by the processor(s), perform the communications and other workflows described below according to embodiments of the disclosure.

Digital engagement system 104, in some implementations, provides the operational and management hub for the system, maintaining (among other things) host accounts and user accounts. A user may have a user account that includes profile information (e.g., name, user identifiers, email address, payment information, etc.), account history and event information (e.g. past bookings, current or upcoming bookings), and one or more items of digital memorabilia. Digital memorabilia refer to digital content having an association with a person-of-interest that, in some implementations, has digitally inscribed (e.g., autographed) such digital content. The digital content may be content related to, suggestive or representative of, a person-of-interest, such as a photographic image of the person-of-interest, an animated image of the person-of-interest, a screen shot of the user interface associated with the interactive communication between the host and the user, or some other image. In some implementations, digital engagement system 104 also supports work flows that allow a user to order physical products (e.g., shirts, coffee mugs, posters, baseballs, and the like) with images of the digital memorabilia stored in association with the user's profile.

Digital engagement system 104, in certain embodiments, also includes functionality directed to supporting an event for a host. Digital engagement system 104 may also include back end, real-time communications (RTC) functionality, such as presence functionality, network address translation (NAT) and firewall traversal, and signaling functions to facilitate peer-to-peer and intermediated connections between host client 106 (and/or host client 107) and user clients 108a-c. In some implementations, the system allows hosts and users to directly interact without any exchange of contact or other personally identifiable information. Similarly, host client 106 and user clients 108a-c may implement interactive connectivity establishment (ICE) functionality (or any other suitable functionality). For example, in some embodiments, digital engagement system 104 can be configured to relay signaling messages between a host client 106 and user client 108a-c to facilitate establishment of peer-to-peer media streaming and/or data connections.

An event, in some embodiments, is a scheduled communications event comprising one or more bookings (e.g., time slots) that can be purchased, if desired by the host (whether by auction or any other methodology established by the host) by one or more users. As discussed more fully below, the host and users directly interact and engage privately and securely over a networked communications session during the booking and, in some embodiments, may further initiate a digital memorabilia workflow where a host inscribes (e.g., autographs and includes a short note) a digital object during the communications session. The interactive communications session may be a video chat or an audio chat. In some implementations, the interactive sessions are one-on-one sessions between the host and a single user. In some implementations described below, the event registration workflow allows hosts to directly engage users without having to share personally identifying or contact information.

In one embodiment, a host can use host client 106 to access digital engagement system 104 to configure an event. Event data can include one or more of the following parameters: the date of the event, the start time for an event, the end time for an event, the title of the event, the name of the host, background information for the host (e.g., former team information, short biographies, etc.), the number and duration of the time slots (bookings) for an event, and the charges or cost of each time slot (if the slots are intended to be monetized). Event configuration data may also include content or links to content (such as promotional material, videos, links to merchandise, etc.) that are to be displayed while users wait in the queue during an event. Event configuration data may also include content or links to content to be displayed to users after completion of a booking. Digital engagement system 104 allows a host to configure one or more of the foregoing parameters. Digital engagement system 104 may publish the event and allow users to register for the event, such as purchasing one or more bookings for the event. In one implementation, digital engagement system 104 creates a landing page for the event. A host may distribute links to the landing page in order to notify users of the event. During registration, digital engagement system 104 may store event data including the identifiers of users that have registered for bookings. In some implementations, digital engagement system 104 may automatically assign time slots to users on a first-come, first-served basis. In other implementations, digital engagement system 104 may allow users to reserve particular time slots. In some implementations, digital engagement system 104 also allows the host to configure one or more time slots of an event as "break" slots—i.e., where no user is assigned the slot to provide a pause or break for the host during the event. Such break slots may be of a shorter or longer duration than regular time slots.

Figure 2:
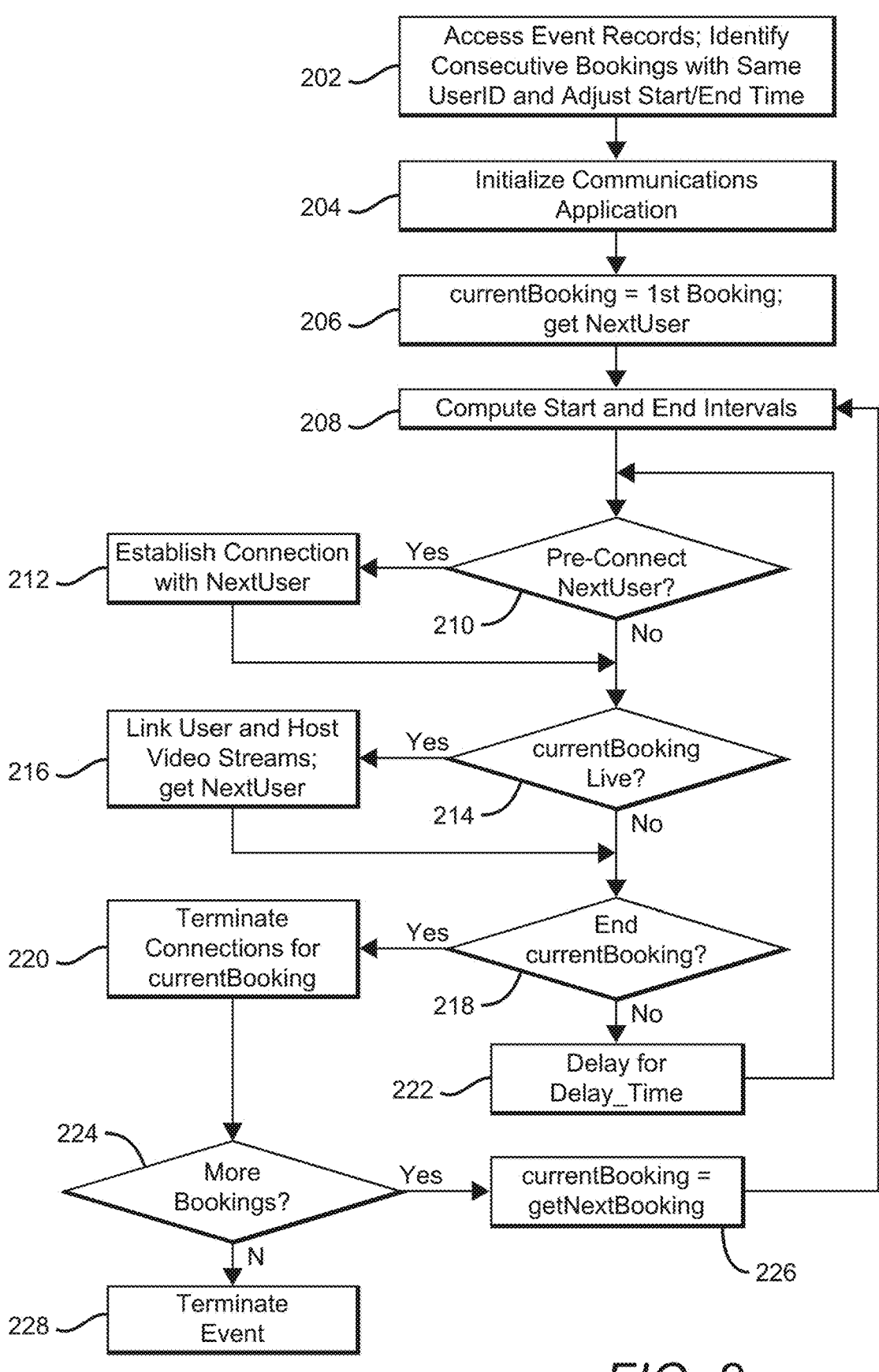
FIG. 2 is a flow chart diagram illustrating a method for implementing embodiments of the disclosure.

FIG. 2 illustrates a method that, in some embodiments, is executed by host client 106 during an event. The functionality described below can be implemented in the context of a browser, a browser plug-in and/or a special-purpose client application executing on host client 106. In some embodiments, a host accesses digital engagement system 104 using host client 106 to log in for an upcoming event. In some implementations, a host log-in causes host client 106 to be registered with a presence and/or signaling system that can facilitate establishing peer-to-peer communications sessions, with user clients 108*a-c*. In some implementations, each of host client 106 and user clients 108*a-c* establish persistent, secure connections with digital engagement system 104 (such as WebSocket over SSL/TLS connections). In some implementations, these WebSocket connections establish the signaling pathway for establishing real-time communications sessions between the host and user clients 106, 108*a-c*, respectively. In some embodiments, host client 106 may access event data, such as event start and end time, the time allocated to each time slot, default image for inscriptions, advertising or other promotional purposes, and other event meta data. Time slot information may include one or more of a slot number, start and end time, a user identifier and user name.

As FIG. 2 illustrates, host client 106 may access event data, such as individual booking records, and identify consecutive bookings associated with the same user (202). For example, a given user may have purchased two or more adjacent bookings. In response, host client 106 may treat adjacent bookings for the same user as a single time slot by adjusting the start and end times accordingly. In some implementations, the event data comprises a) a slot identifier, b) a user identifier associated with the user (and, in some implementations, network address information (public internet protocol (IP) address and listening port number) associated with a user client 108*a*), c) browser and hardware attributes of user client 108*a, d*) detected bandwidth, and c) basic user information (e.g., full name, etc.). In some implementations, the signaling system of digital engagement system 104 may store ICE candidate information (such as public IP address information (and, in some embodiments, listening port information)) for the host client 106. Additionally, as users log in for a given event using user clients 108*a-c*, the signaling functionality may store one or more user identifiers in association with the event. The one or more user identifiers may include a userid and ICE candidate information (such as the public IP address information (and, in some embodiments, listening port information)) associated with the user clients 108*a-c*. In some implementations, the user clients 108*a-c* provide a listening port number associated with secure connections initiated by host system 106, as described below. In one implementation, host client 106 and user clients 108*a-c* interact with a STUN (Session Traversal Utilities for NAT) server, and execute other ICE functions, to obtain ICE candidate information (such as their respective public IP addresses, relay servers, etc.) and transmit them to signaling functionality of digital engagement system 104. In some implementations, such STUN and ICE processes to develop ice candidate information are performed later as part of the signaling workflow between host client 106 and user client 108*a*.

Host client 106 initializes the communications functionality of the host application (204). In embodiments, bookings feature a private and secure interactive video chat session between the host and one or more users. In some embodiments, the host application may utilize WebRTC, a framework for implementing real time communications in the context of a browser or other client application. The WebRTC framework includes network, audio and video components used in voice and video chat applications, such as audio and video codecs and engines, as well as NAT and firewall traversal technologies (e.g., STUN, ICE, TURN, RTP-OVER-TCP, etc.), and supports signaling technologies (e.g., SIP, XMPP/JINGLE et al.) for establishing peer-to-peer connections. These components, when implemented in a browser, can be accessed through a JavaScript API, enabling a RTC-enabled web-based application. In embodiments, the host application initializes to test or verify that the host client's local input/output functions are operational— e.g., that the video and audio feeds from the camera and microphone, respectively, of host client can be accessed-prior to commencing the event. Other initialization functions may include registering with signaling and/or presence functionality (e.g., XMPP presence functions) of digital engagement system 104 and testing network input/output functions, such as supported browser or operating system types, available bandwidth, network delay, etc. In some implementations, the user application hosted on user client 108*a* can perform the same or similar tests.

Host client 106 then accesses the event record for the current event to load the first booking and set the NextUser variable to the user identifier associated with an upcoming booking (206). In connection with the first booking and before the booking starts, NextUser is set to the user associated with the first booking. Host client 106 also computes the start and end time intervals for the current booking (208). As discussed below, host client 106 synchronizes its internal clock with digital engagement system 104 for the purposes of the time-based functions described herein. User clients 108*a-c* perform the same operations such that the internal clocks of all participants are substantially synchronized during an event.

In the embodiment shown in FIG. 2, host client 106 establishes the network connections to users before the start of each booking to facilitate initiation of the communications connections associated with the bookings and precise transitions between them in an efficient manner. In an embodiment, host client 106 compares the start time of the booking associated with the NextUser variable to the current time (210). In an embodiment, if the start time of the booking is within a threshold (e.g., 30 seconds), host client 106 establishes network connections for communicating with the user for the upcoming booking (212). In an embodiment, host client 106 accesses the booking record to determine the user identifier of the user and uses this identifier in a signaling protocol to establish an interactive video chat session with the user client 108*a* corresponding to the identified user. The signaling and connection protocol functionality may involve XMPP and/or SIP functionality, as well as ICE, TURN, STUN or other NAT traversal functionality. For example, host client 106 may initiate a connection by engaging in an exchange of handshake messages with user client 108*a*. The handshake messages may include session description information (and ice candidate information) transmitted between host client 106 and user client 108*a* using the respective WebSocket connections with digital engagement system 104. The handshake messages may include a user identifier that digital engagement system 104 uses to forward to the user client 108*a* to which to forward the request. Conversely, handshake messages transmitted by user client 108*a* may include an identifier associated with the host (either a permanent or temporary identifier) that is used in forwarding messages to host client 106. Digital engagement system 104 forwards the connection handshake messages between user client 108*a* and host client 106 using the corresponding WebSocket connection. Host client 106 and user client 108*a* may also execute ICE protocols to obtain ICE candidate information. User client 108*a* may transmit session description and ICE candidate information to host client 106 in responsive communications over the signaling pathway (via digital engagement system 104). Host client 106 and user client 108*a* may trickle ICE candidate information as it becomes available. As discussed above, ICE candidate information processes, in some embodiments, may be executed prior to initial signaling and pre-stored in connection with the event data. Host client 106 and user client 108*a* may use the exchanged ICE candidate information to establish one or more real-time connections (such as peer-to-peer or relayed connections). In some implementations, the ICE candidate information includes public IP addresses and port numbers and may comprise host candidate, server candidate and relay candidate information. The established connections remain in the background and available for later use while the user waits in the queue before his or her respective time slot.

After the network connections are established, host client 106 links the user and host video data streams (216) at the booking start time (214). In one embodiment, host client 106 sets the NextUser variable to the user corresponding to the next booking for the pre-connection functions (210, 212) to establish the required network connections, while the current booking is live. In this manner, host client 106 pre-connects with the next user before the start of a given booking. To initiate the booking, host client links the streams by writing its video/audio data to the socket associated with the network connection and rendering data received from the user on the graphical user interface of host client 106. In embodiments, host client 106 terminates connections (220) at the end of a booking (218). Host client 106 performs these checks on a periodic basis (222) during a booking, as depicted in FIG. 2. As FIG. 2 illustrates, host client 106 repeats these functions for all bookings associated with an event (224, 226, 228). In this manner (and using the complementary processes executed by user client 108*a*), a host may connect sequentially with a plurality of users for real-time direct, secure communications, while maintaining privacy and security of personal contact information—e.g., without having to exchange contact information to users in order to establish the connections.

Figure 4A:
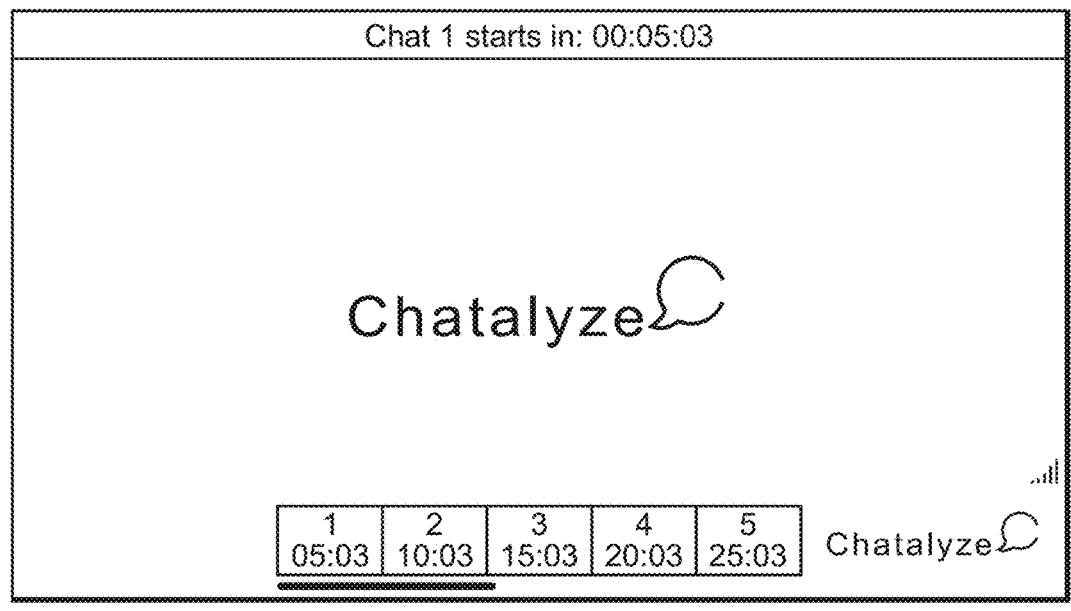
FIGS. 4A and 4B are schematics illustrating host graphical user interfaces for implementing embodiments of the disclosure.
Figure 4B:
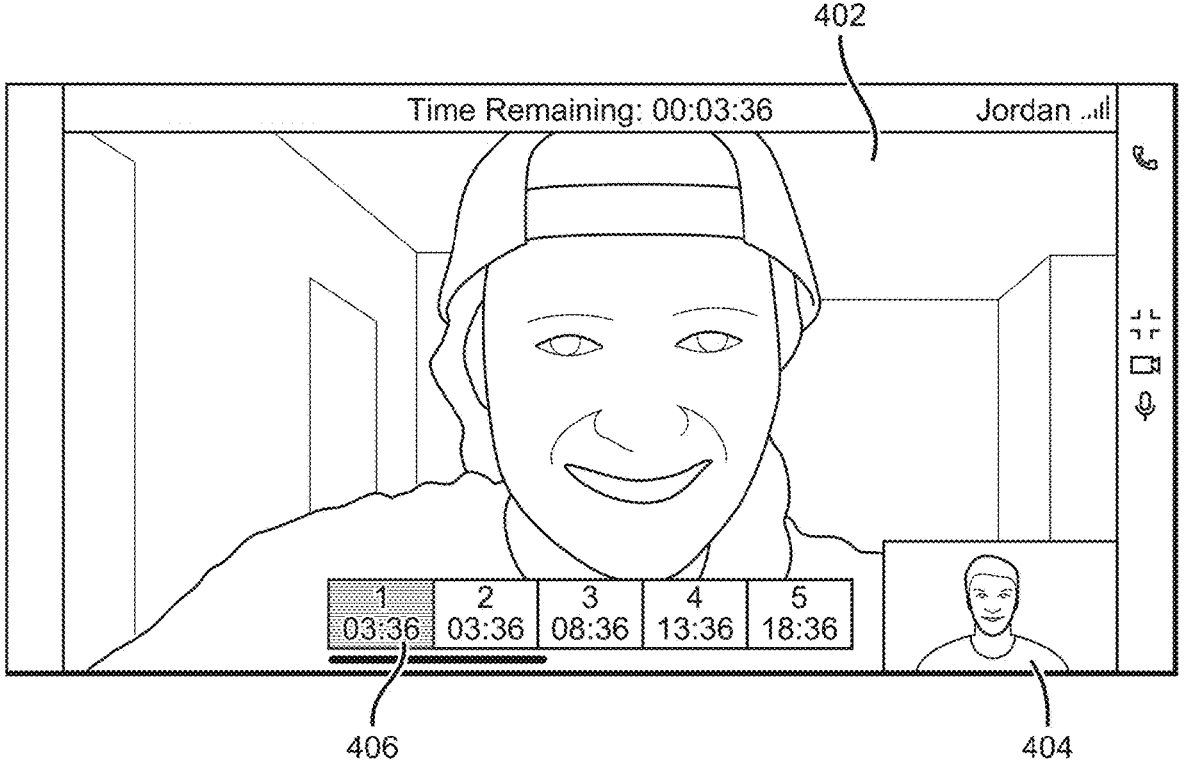

FIGS. 4A and 4B illustrate example interfaces that host client 106 may display during the workflow illustrated in FIG. 2. Host client 106 may display the user interface depicted in FIG. 4A when the host logs in to digital engagement system 104 before the start of a given event. In the embodiment shown, the user interface includes a queue section that includes status information for the bookings. In one implementation, the user interface may be embodied as a web page transmitted to a browser or other application hosted by user client 108*a*. Status information can include a countdown timer to start or completion and other status indicators. During a booking, host client 106 may display the user interface depicted in FIG. 4B. As depicted, the user interface may include a user video section 402 and a host video section 404. The user interface may also provide an indication 406 as to the time remaining in the current booking.

Other implementations are possible. In other embodiments, a time slot may end before the scheduled end time. Although not illustrated in FIGS. 4A and 4B, the user interface displayed by host client 106 may further include controls allowing a host to manually terminate the real-time communications session associated with a given booking. In some implementations, host client 106 unlinks the audio and video streams and terminates the connections associated with the current booking. On the host side, the next booking and the associated workflows occur at the originally scheduled time. In some implementations, however, the next booking may be advanced to an earlier time. In some embodiments, host client 106 will pre-connect with the next user in the queue after a threshold period of time (e.g., 30 seconds to a minute) after the current session begins. While the next user is pre-connected for a longer period of time, such an embodiment facilitates seamless transfers where the host is provided the ability to terminate bookings on a manual basis. In other implementations, time slots are allocated, but have no defined start or end time. In such implementations, the first time slot has a start time. However, the host manually ends each time slot, causing the next user interaction identified in the queue to begin.

Figure 3:
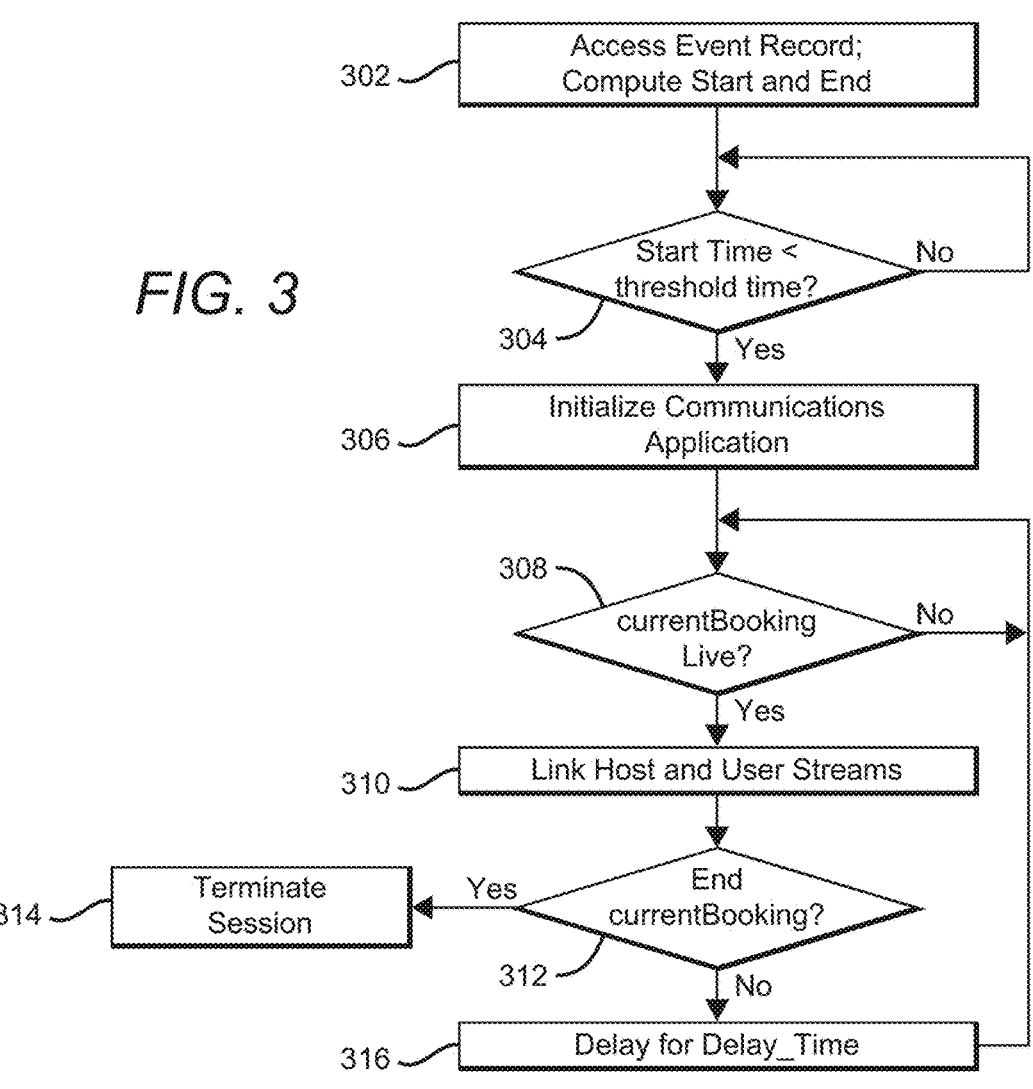
FIG. 3 is a flow chart diagram illustrating a method for implementing embodiments of the disclosure.

FIG. 3 illustrates an example process that may be implemented by user clients 108a-c during an event after a user logs in to digital engagement system 104. In some implementations, a user log-in causes user client 108a to be registered with a signaling and/or presence system (in one embodiment, implemented by digital engagement system 104) that can facilitate establishing peer-to-peer personal, direct, private and secure real-time communications sessions with hosts. The functionality described below can be implemented in the context of a browser (using, for example, the WebRTC functionality discussed herein), a browser plug-in and/or a special-purpose client application executing on user client 108a. As discussed above, user client 108a may establish a persistent, secure connection (such as a Web-Socket connection) with digital engagement system 104 to be used later in a signaling pathway in connection with host client 106. The processing illustrated in FIG. 3 is complementary to the host-side functions set forth above. For example, in the embodiment shown above, host client 106 initiates connections with user clients 108a-c, while user clients 108a-c are not allowed to initiate interactive communication sessions over digital engagement system 104. Accordingly, FIG. 3 does not include illustrated steps for initiating connections. In other embodiments, user clients 108a-c may initiate connections with host client 106 according to the scheduled bookings of a given event.

In the implementation shown, user client 108a computes the start and end intervals for its booking (302). User client 108a may employ time synchronization functions, as disclosed herein, to synchronize timing with host client 106. In some embodiments, the user client 108a, after logging in to the event, may display an event page, retrieved from digital engagement system 104, to the corresponding user. The event page can identify the position of the user in the queue of bookings. The event page may also include a countdown timer indicating the time until the user's booking starts. The event page may also include other information, such as promotional videos, affiliate links, and the like. In the embodiment shown, user client 108a initiates its communications application functions in preparation for an upcoming booking (304, 306). Initiation functions can involve the same or similar checks performed by host client 106 discussed above. As discussed above, host client 106 has already established the network connections for real-time communications for the booking with user client 108a. Accordingly, in the embodiment shown, user client 108a links the host and user video streams when the booking becomes live (308, 310). User client 108a terminates the session (314) at the end of the booking (312). As shown, user client 108 delays the decisional checks (308, 310) for a period of time (e.g., 1 second, 500 milliseconds, or 250 milliseconds).

Figure 5A:
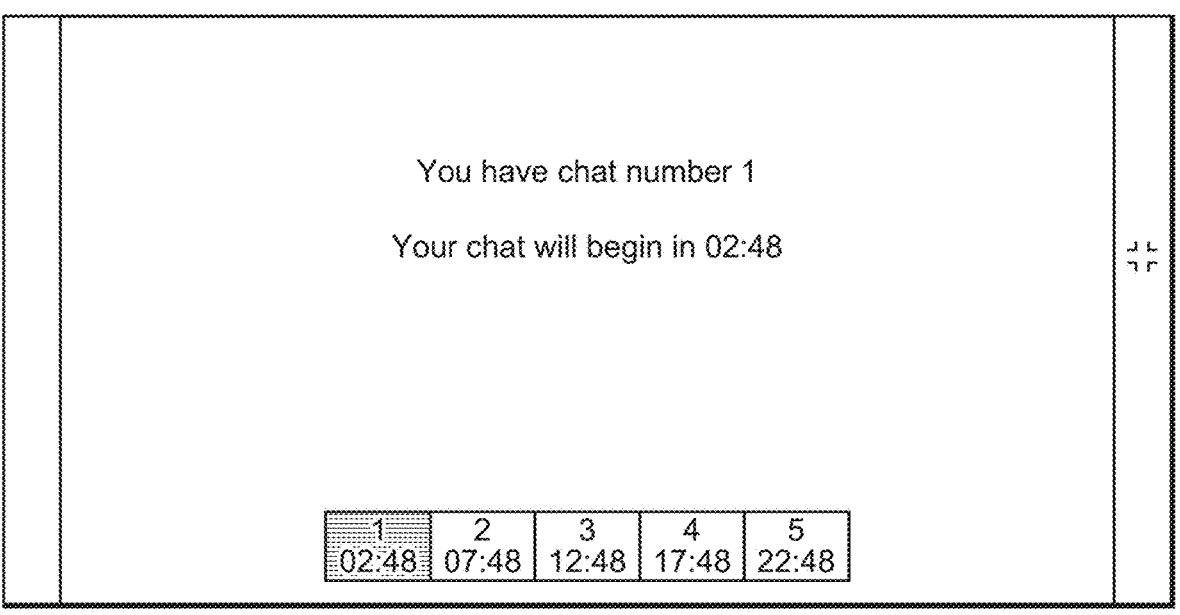
FIGS. 5A, 5B and 5C are schematics illustrating user graphical user interfaces for implementing embodiments of the disclosure.
Figure 5B:
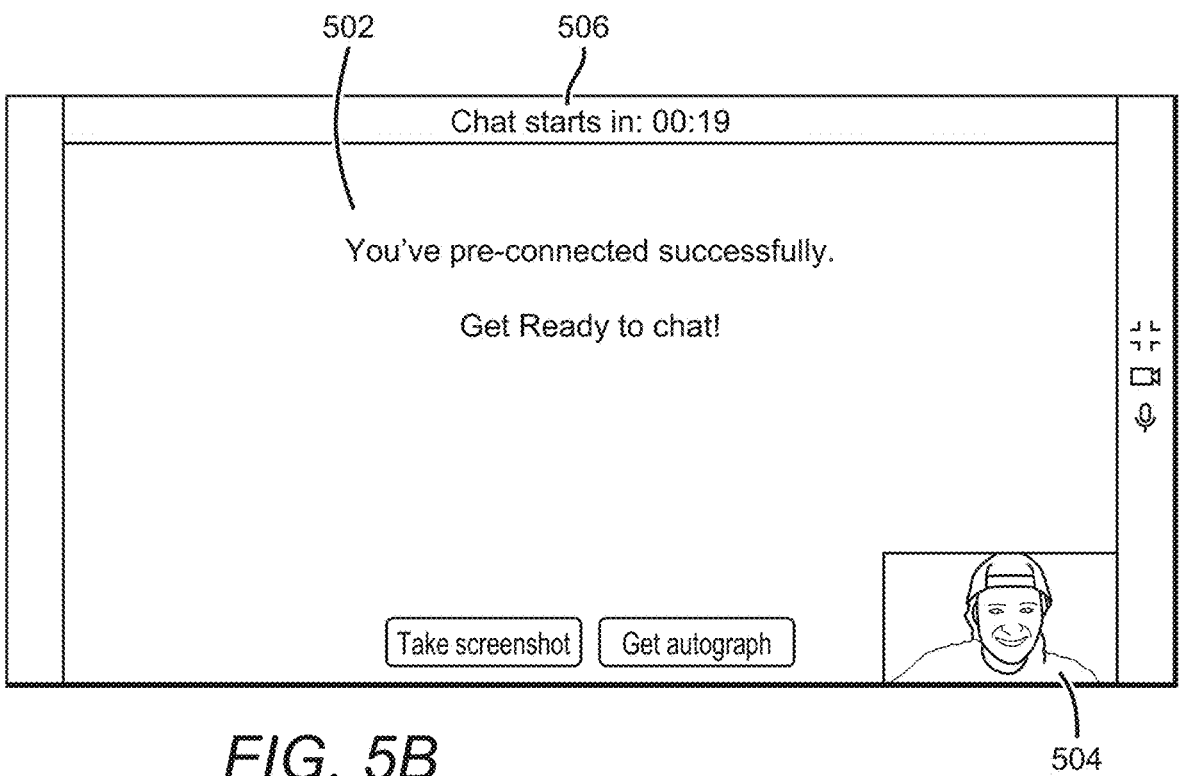
Figure 5C:
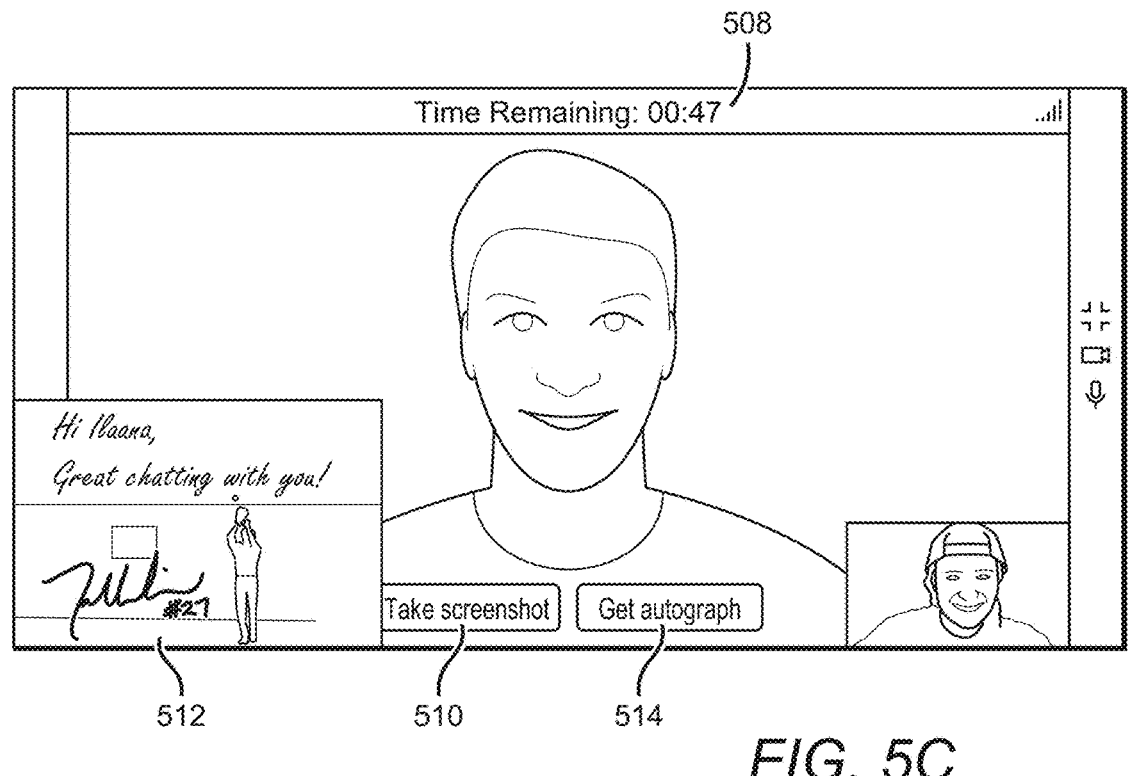

FIGS. 5A, 5B and 5C illustrate example interfaces that user client 108a may display during the workflow illustrated in FIG. 3. User client 108a may display the user interface depicted in FIG. 5A when the user logs in to digital engagement system 104 before the start of a given event. The user interface may include a queue indicating the user's booking position in the event and status information (such as a countdown timer). In some implementations, digital engagement system 104 may transmit text, email or other messages to users to notify them of status changes (such as advancing positions in the queue, etc.) User client 108a may display the user interface depicted in FIG. 5B after the communications application has been initiated and the pre-connection functions have executed, but prior to the start time of the booking. As shown, the user interface may include host video section 502, user video section 504 and status indicator 506 with a countdown timer to the start of the booking. In some implementations, the user interface depicted in FIG. 5B may be displayed only when user client 108a is pre-connected to host client 106; however, in other implementations, the user interface may separately include an icon or other pre-connection indicator. User client 108a may display the user interface depicted in FIG. 5C when the host stream is linked to the session with a status indicator 508 of the time remaining in the booking.

Other implementations are possible. For example, in an embodiment where digital engagement system 104 intermediates communications sessions between hosts and users, the digital engagement system 104 may perform the pre-connection functionality discussed above to connect and preconnect individual users to a video chat session. In addition, more than one user may be connected to an interactive session. In such an embodiment, the pre-connection functions are applied in connection with two or more users. In another embodiment, users can register for an event and be added to the booking queue after the start of the event. For example, a host may post a notification that he or she is presently available. The host may log in to digital engagement system 104 using host client 106. As users learn of and register for the event, the users are added to the queue maintained by host client 106, which operates as discussed above to connect to the user clients 108a-c in the sequence provided in the queue. If the queue is depleted, the host client 106 waits for new entries and alerts the host accordingly. If there is a next user waiting on the queue, host client 106 may pre-connect with the user client 108a associated with the next user after a period of time during the current interactive communications session.

As FIG. 5C illustrates, the user client interface may include controls 510 that allows a user to take a screenshot "selfie" image of the current communications session and store it in an image library associated with the user's account. In other embodiments, the user client may automatically capture a screenshot "selfie" image of the current communications session at a preset time after start of the session (such as 8 seconds, 15 seconds, 1 minute or 2 minutes after the session has begun) and store it in an image library associated with the user's account. In some implementations, the user client interface may include elements (e.g., a countdown timer) that alert the user to the fact and timing of the image capture. The host client interface hosted by host client 106 may also include corresponding functionality to warn the host of the impending image capture. In some implementations, the user may select the screenshot or select other image content (such as an image of the host) and request an inscription (e.g., an autograph and/or short note) by the host of the subject image. In one embodiment, the subject image appears in canvas section 512. In some embodiments, a default image (e.g. an image of the host) or the screenshot "selfie" is automatically loaded into the canvas section 512 at a specific time during the chat. The user client interface may also include controls 514 that allow the user to request an inscription from the host.

In one embodiment, host client 106, as well as user clients 108a-c, synchronize timing functionality to facilitate starting and ending bookings with precision. In some embodiments, network time protocol (NTP) functionality can be used to synchronize timing among host client 106, user clients 108a-c, and digital engagement system 104. In one implementation, digital engagement system 104 utilizes the NTP protocol to set its time clock. In some implementations, the time synchronization functions employed by host client

106 and user clients 108*a-c* account for the delays by the server to process the request and the transmit delays for the client to receive it. After joining the event, host client 106 and user clients 108*a-c* query digital engagement system 104, in some embodiments, nine (9) (or other configurable number) times for the current system time. In one implementation, the client sends a request to the server, receives a response and stores the response and the delay between the request and response. In one implementation, the client stores the client system clock times corresponding to when the request was sent (request time) and when the response was received (response time). If the delay time is more than a threshold (e.g., 250 milliseconds), the client ignores or drops the request-response sample. This process is repeated until the client collects 9 samples. From the collected samples, the client computes an average time difference between the client system clock and the server system clock. In one implementation, the client computes a one-way delay time between the client and the server by taking half of the round-trip delay [one-way delay=(response time−request time)/2]. The client then computes an estimated true server time by subtracting the server system clock time (reported server time) received in the response by the one-way delay (est. Server time=reported server time−one-way delay). The client then determines the difference between its system clock and the server by subtracting est. Server time by request time. At any given time, the client (host 106 or user 108*a-c*) determines the system-wide time by adjusting its client system clock by the determined average time difference over the nine samples. In some embodiments, host client 106 and user clients 108*a-c* re-query the server 9 times at regular intervals of 10 to 60 seconds (or other suitable interval), and re-adjust their local time references as appropriate. In one implementation, the re-sync interval is adjusted based on any observed system time drift. In other words, if drift is found the re-sync frequency is kept high to facilitate accurate timing. This ensures that host client 106 and user clients 108*a-c* maintain their time references in synchronization during a long running event. Host and user client times will generally track backend system time within 10-20 msec, depending on many factors, such as network delay, processing speed of local devices, temperature, etc. Other implementations are possible. For example, the ntp query result with the lowest network latency may be considered the local time reference for that client.

In certain embodiments, user client 108*a* maintains a persistent connection (e.g., a WebSocket connection) to digital engagement system 104 during at least the booking for which the corresponding user is registered. In one embodiment, a host may log into digital engagement system 104 with both host client 106 and host client 107. Host client 106 may be a desktop computer, laptop computer, tablet, smartphone, video conferencing system or any other end system with RTC capabilities. The host may use host client 106 for the RTC or video chat sessions with users. In the embodiment shown, host client 107 may be a tablet, phablet, smartphone or any other system with an interactive user-interface device including devices that employ a touch-screen, a gesture-based system or any other method for interacting with a communications device. In one implementation, host client 107 may further include a digital pen or stylus that facilitates the inscription process. As discussed below, the host may use host client 107 to digitally inscribe a digital object requested by a user during a booking. While the host is logged in, both host client 106 and host client 107 may maintain persistent connections with digital engagement system 104. In some implementations, when (or before) a user requests an inscription, user client 108*a* may attempt to establish a peer-to-peer connection (e.g., peer-to-peer WebSocket i/o (e.g., socket.io)) with host client 107 using the persistent connections described herein as a signaling channel. In other implementations, digital engagement system 104 intermediates the data flow between user client 108*a* and host client 107 (either as a design choice or when a peer-to-peer connection over network 102 is unable to be established).

Figure 6:
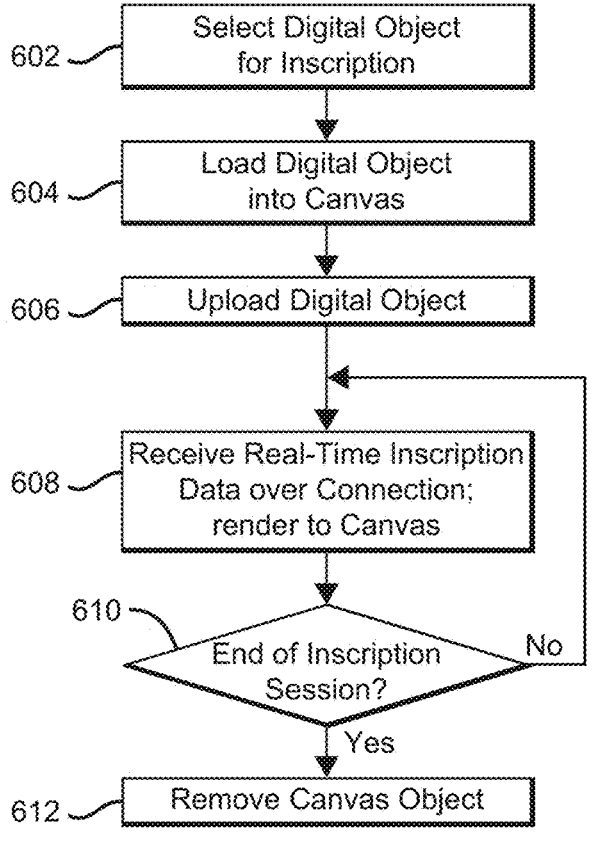
FIG. 6 is a flow chart diagram illustrating a method for implementing embodiments of the disclosure.

FIG. 6 illustrates an example method implemented by user client 108*a* during a real-time inscription workflow. As discussed above, a user may select a digital object for the host to inscribe using controls 510 (602) or a default digital object may automatically be selected by the system. The digital object may be a screenshot of the current video chat session, a digital object selected from a library hosted by digital engagement system 104, a digital object located on user client 108 or any other system. In one implementation, user client 108*a* loads the digital object into canvas section 512 upon selection (604). A user may initiate an inscription request by clicking on the image in canvas section 512 causing user client 108*a* to upload the image to digital engagement system 104 (606). In other implementations, user client 108*a* initiates this upload process automatically without requiring input from the user. In some implementations, user client 108*a* may compress the digital object prior to upload. As discussed below, an inscription request initiates a notification to host client 107 through digital engagement system 104 (or directly from user client 108*a* via a peer-to-peer connection). This notification initiates an inscription completion workflow illustrated in FIG. 7 at host client 107. In one implementation, during this workflow, user client 108*a* receives real-time inscription data (in one implementation, as a series of messages with coordinate data) from host client 107 and renders the real-time inscription data in canvas section 512 as it is received (608). Upon completion of the inscription (610), user client 108*a*, in one implementation, maintains the digital object in canvas section 512 (612). In other implementations, user client 108*a* removes canvas section 512 from the interface after the inscribed image has been stored or otherwise associated with the user's account. As discussed below, host client 107 transmits the inscribed digital object to digital engagement system 104 for association with the user's account. In one implementation, after a user requests an inscription, the request controls are disabled, allowing the user only a single request per session. In other implementations, users may request more than one inscription per session. In some implementations, inscriptions and autographs incur additional charges. In some implementations, the user interface provided to the user facilitates generating orders for physical objects having the inscribed digital object printed or otherwise affixed thereto, such as shirts, hats, coffee mugs, posters and the like.

FIG. 7 illustrates an example method implemented by host client 107 during a real-time inscription work flow. As discussed herein, a host using host client 107 may log into digital engagement system 104 in order to receive inscription requests during interactive sessions with users. As discussed herein, the host is also logged in to digital engagement system 104 with host client 106 for purposes of the interactive video chat session. In some implementations, when a user requests an inscription or when a request is sent automatically, the request or other notification includes data (such as event and/or host identifiers) that allow digital engagement system 104 to identify the host client 107 to notify. In the implementation shown, host client 107 downloads the digital object associated with the inscription request (704) in response to receiving a corresponding notification (702). In other implementations, digital engagement system 104 may push the digital object to host client 107. Host client 107 then loads the digital object into a canvas section of the user interface (706) for the host to inscribe.

Figure 8:
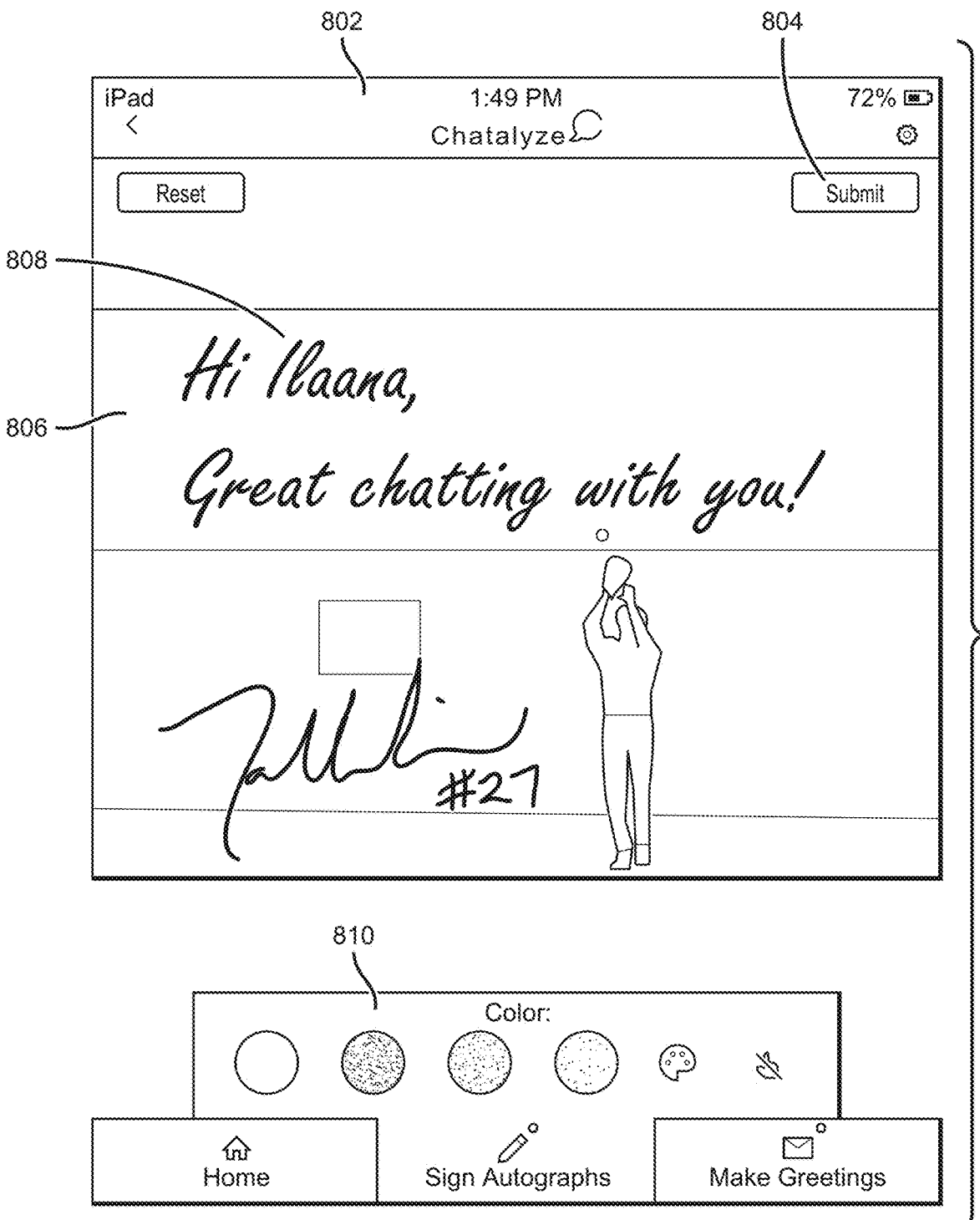
FIG. 8 is a schematic illustrating a graphical user interface for generating digital inscriptions.

FIG. 8 illustrates an example user interface 802 provided by host client 107. As FIG. 8 shows, user interface 802 includes canvas section 806, submit control 804 and signing controls 810. In one implementation, the canvas section 806 is a relatively large area of the interface 802. FIG. 8 illustrates a scenario where the host is inscribing a default image of the host for the user. As discussed herein, the digital object can be any item of digital content including without limitation a digital picture, animated image, custom graphic or digital video. As discussed above, host client 107 includes a touch display that allows a host to manually generate a digital inscription 808 (e.g., an autograph and/or a short note) overlaid on the digital object. In some implementations, host client 107 may operate in connection with a pen-based or stylus device. Stylus controls 810 allow the host to select a color for the inscription, and specify whether a Bluetooth-enabled stylus, a regular stylus or a finger will be used for inscriptions. Other implementations may further include controls for emojis and creating digital signatures. Submit control 804, when actuated, causes host client 107 to upload the inscribed digital object to digital engagement system 104 and store it in the associated user's account.

As FIG. 7 illustrates, as the host inscribes the digital object (710), host client 107 receives the real-time inscription data input from the host, renders it to the canvas section and transmits the inscription data as it is received in real-time to user client 108*a* for display in canvas section 512 (708). In one implementation, as the host draws his signature and/or other inscription text on host client 107, host client 107 sends WebSocket (e.g., socket.io) messages (including pen color and x,y coordinates) to user client 108*a*, which renders the inscription in window section 512 in real-time. When the host has completed the inscription (710), host client 107 captures the final inscribed image (712) and uploads it to digital engagement system 104 (714), which stores the inscribed digital object in association with the user's profile. In one implementation, the inscribed object remains in the window section 512 of the user interface displayed by user client 108*a* for the remainder of the interactive session. In other implementations, user client 108*a* removes window section 512 after the inscription workflow completes. Digital engagement system 104 may notify the user of the availability of the inscribed object and include a link to the object in a notification message. In some implementations, if the current booking ends before the host completes the inscription process, host client 107 maintains the image for later completion and upload.

Using physically separate host clients 106, 107 for chat and inscription functions has certain advantages. For example, the orientation of host client 107 while generating an inscription does not affect the interactive video session with the user because the camera associated with host client 106 captures video during the interactive session and does not move. Accordingly, this implementation allows the host to place host client 107 on a flat surface to facilitate inscription creation and further allows the user to continue to view the host during the inscription.

In terms of authentication, the digital memorabilia generated using digital engagement system 104 is authenticated the same way items are when a person witnesses the signing as it occurs, given that the same host is logged in using both host client 106 and host client 107. For example, a ball or picture that a player signs for a fan in-person often times does not include a certificate of authentication. The fan knows the player signed it because the fan witnessed the signing. The same is true for digital memorabilia generated using digital engagement system 104. The user knows he or she is chatting with the player (host) and can see indications that the player is signing in real-time. In some implementations, host client 107 and/or digital engagement system 104 may digitally sign the final, inscribed object with a digital certificate, using cryptographic technologies.

FIG. 9 illustrates an example of a computer system 1100 that may be used to execute program code stored in a non-transitory computer readable medium (e.g., memory) in accordance with embodiments of the disclosure. Any of servers 105, user clients 108*a-c*, and host clients 106, 107 may incorporate the computer system architecture illustrated in the following description. The computer system includes an input/output subsystem 1102, which may be used to interface with human users and/or other computer systems depending upon the application. The i/o subsystem 1102 may include, e.g., a keyboard, mouse, graphical user interface, touchscreen, or other interfaces for input, and, e.g., a LED or other flat screen display, or other interfaces for output, including application program interfaces (APIs). Other elements of embodiments of the disclosure, such as the prioritization engine may be implemented with a computer system like that of computer system 1100.

Program code may be stored in non-transitory media such as persistent storage in secondary memory 1110 or main memory 1108 or both. Main memory 1108 may include volatile memory such as random access memory (RAM) or non-volatile memory such as read only memory (ROM), as well as different levels of cache memory for faster access to instructions and data. Secondary memory may include persistent storage such as solid-state drives, hard disk drives or optical disks. One or more processors 1104 reads program code from one or more non-transitory media and executes the code to enable the computer system to accomplish the methods performed by the embodiments herein. Those skilled in the art will understand that the processor(s) may ingest source code, and interpret or compile the source code into machine code that is understandable at the hardware gate level of the processor(s) 1104. The processor(s) 1104 may include graphics processing units (GPUs) for handling computationally intensive tasks.

The processor(s) 1104 may communicate with external networks via one or more communications interfaces 1107, such as a network interface card, WiFi transceiver, etc. A bus 1105 communicatively couples the i/o subsystem 1102, the processor(s) 1104, peripheral devices 1106, communications interfaces 1107, memory 1108, and persistent storage 1110. Embodiments of the disclosure are not limited to this representative architecture. Alternative embodiments may employ different arrangements and types of components, e.g., separate buses for input-output components and memory subsystems.

Those skilled in the art will understand that some or all of the elements of embodiments of the disclosure, and their accompanying operations, may be implemented wholly or partially by one or more computer systems including one or more processors and one or more memory systems like those of computer system 1100. Some elements and functionality may be implemented locally and others may be implemented in a distributed fashion over a network through different servers, e.g., in client-server fashion, for example. In particular, server-side operations may be made available to multiple clients in a software as a service (SaaS) fashion.

Several features and aspects of the present invention have been illustrated and described in detail with reference to particular embodiments by way of example only, and not by way of limitation. While the examples described above are disclosed as operating in a consumer context, embodiments of the invention have enterprise applications. For example, a host may be a corporate interviewer (or interviewee), while the users may be various interviewees (or interviews) that have registered to talk to the host. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A computer-implemented method for scheduling and establishing communications sessions with a plurality of users, comprising maintaining, in a computer-readable memory, an event data structure corresponding to an event, the event data structure including one or more time slot records, each time slot record associated with a time slot and including data associated with a user;

receiving, from first and second computing systems, requests to register attendance for the event, wherein the first computing system is associated with a first user and the second computing system is associated with a second user;

synchronizing a local system clock with a remote host;

maintaining, during a first time slot, a first network connection with the first computing system for a first communication session with the first user identified in the first time slot of the event data structure;

transmitting media data over the first network connection during the first time slot;

establishing, during the first time slot, a second network connection with the second computing system for a second communication session with the second user associated with a second time slot in the event data structure;

terminating the first communication session; and initiating the second communication session by transmitting media data over the second network connection established during the first time slot.

2. The method of claim 1 further comprising repeating the establishing, terminating and initiating steps for remaining time slots in the event data structure.

3. The method of claim 1 wherein one or more of the first and second network connections are peer-to-peer connections.

4. The method of claim 1 wherein one or more of the first and second network connections are server-intermediated connections.

5. The method of claim 1 wherein the establishing the second network connection is initiated at a predetermined time after a start of the first time slot.

6. The method of claim 1 wherein the establishing the second network connection is initiated at a predetermined time before an end of the first time slot.

7. The method of claim 1 further comprising establishing the first network connection at a predetermined time before a start of the first time slot.

8. A system for scheduling and establishing direct communications sessions with a plurality of users, comprising an event registration server operative to:

maintain, in a computer-readable memory, an event data structure corresponding to an event associated with a first entity, the event data structure including one or more time slot records, each time slot record associated with a time slot and including data identifying a user;

host information describing the event on a network accessible resource;

receive requests from users to register for the event; and modify the event data structure to associate a time slot record to corresponding users associated with the requests; and a real-time event communications system, wherein the real-time communications event system is operative to:

synchronize a local system clock with a remote host;

establish a first network connection with a remote computing system, the remote computing system associated with the first entity;

access the event schedule information maintained in the event data structure, wherein the event schedule information comprises an ordered set of the one or more time slots corresponding to one or more time slot records; and establish, based on the event schedule information contained in the event data structure, real-time communications sessions between the remote client associated with the first entity and the network clients of the users in a sequence corresponding to the ordered set of time slots.

9. The system of claim 8 wherein the event registration server is further operative to receive event configuration information from the first entity, wherein the event configuration information comprises one or more of an event date, start time, and time slot configuration data.

10. The system of claim 8 wherein the one or more time slot records include a start time.

11. The system of claim 8 wherein the real-time event communications system is further operative to transmit queue information to one or more network clients corresponding to users registered for the event, wherein the one or more network clients display the queue information indicating the respective positions of corresponding users in the sequence.

12. The system of claim 11 wherein the event data structure further includes one or more references to content; and wherein the real-time event communications system is further operative to transmit the content or the references to content to the one or more network clients for display in conjunction with the queue information.

13. The system of claim 8 wherein, to establish the real-time communications connections, the remote computing system is further operative to:

maintain, during a first time slot, a first network connection for a first communication session with a first user identified in the first time slot of the event data structure;

establish, during the first time slot, a second network connection for a second communication session with a second user associated with a second time slot in the event data structure;

terminate the first communication session; and initiate the second communications session by transmitting audio-visual data over the second network connection established during the first time slot.

14. The system of claim 8 wherein the remote computing system and the network clients are operative to execute a time synchronization protocol with the real-time event communications system.

15. The system of claim 8 wherein a number and duration of the time slots are configurable by the first entity.

\*    \*    \*    \*    \*